(12) United States Patent
Graf et al.

(10) Patent No.: US 9,569,138 B2
(45) Date of Patent: Feb. 14, 2017

(54) COPYING VIRTUAL MACHINE FLAT TIRES FROM A SOURCE TO TARGET COMPUTING DEVICE BASED ON MATCHING DISK LAYOUT

(71) Applicant: International Business Machines Corporation, Armonk, NY (US)

(72) Inventors: Florian D. Graf, Zurich (CH); Xiao Bi Liang, LingBao (CN); Shao Yang Yu, Beijing (CN); Chi Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/739,145

(22) Filed: Jun. 15, 2015

(65) Prior Publication Data

US 2016/0364257 A1 Dec. 15, 2016

(51) Int. Cl.
*G06F 3/06* (2006.01)
*G06F 17/30* (2006.01)
*G06F 9/455* (2006.01)
*G06F 11/14* (2006.01)

(52) U.S. Cl.
CPC ............... *G06F 3/065* (2013.01); *G06F 3/06* (2013.01); *G06F 3/0683* (2013.01); *G06F 9/45558* (2013.01); *G06F 11/1402* (2013.01); *G06F 17/30233* (2013.01); *G06F 2009/4557* (2013.01); *G06F 2009/45583* (2013.01)

(58) Field of Classification Search
CPC .......... G06F 3/065; G06F 3/06; G06F 9/0683; G06F 9/45558; G06F 11/1402; G06F 17/30233; G06F 2009/4557; G06F 2009/45583
See application file for complete search history.

(56) References Cited

U.S. PATENT DOCUMENTS

| | | | |
|---|---|---|---|
| 7,669,020 B1* | 2/2010 | Shah | G06F 11/1458 711/162 |
| 8,060,476 B1* | 11/2011 | Afonso | G06F 11/1451 707/649 |
| 8,135,930 B1* | 3/2012 | Mattox | G06F 9/45558 711/100 |
| 8,473,463 B1* | 6/2013 | Wilk | G06F 11/1453 707/647 |
| 8,635,429 B1* | 1/2014 | Naftel | G06F 12/16 711/162 |
| 8,683,156 B2 | 3/2014 | Bahadure et al. | |
| 8,719,286 B1 | 5/2014 | Xing et al. | |

(Continued)

*Primary Examiner* — Benjamin Wu
(74) *Attorney, Agent, or Firm* — Maeve Carpenter (57) ABSTRACT

In one approach, a computer mounts a computing device to a target instance, where the computing device stores one or more virtual disks of a source instance, and wherein the target instance includes one or more local disks. The computer detects a disk layout of the source instance. The computer matches the disk layout of the source instance to a disk layout of the target instance. The computer attaches the one or more virtual disks of the source instance to the corresponding one or more local disks of the target instance, where the one or more virtual disks of the source instance are attached as one or more flat files. The computer copies the one or more flat files to the corresponding one or more local disks of the target instance.

20 Claims, 6 Drawing Sheets

(56) References Cited

U.S. PATENT DOCUMENTS

| | | | | |
|---|---|---|---|---|
| 8,751,515 | B1* | 6/2014 | Xing | G06F 17/30073 |
| | | | | 707/755 |
| 9,389,800 | B1* | 7/2016 | Natanzon | G06F 3/065 |
| 2010/0049750 | A1* | 2/2010 | Srivastava | G06F 11/1435 |
| | | | | 707/E17.005 |
| 2010/0070725 | A1* | 3/2010 | Prahlad | G06F 11/1453 |
| | | | | 711/162 |
| 2011/0265076 | A1* | 10/2011 | Thorat | G06F 8/65 |
| | | | | 717/172 |
| 2012/0084775 | A1* | 4/2012 | Lotlikar | G06F 9/45558 |
| | | | | 718/1 |
| 2012/0215998 | A1* | 8/2012 | Sharp | G06F 3/061 |
| | | | | 711/162 |
| 2013/0151802 | A1* | 6/2013 | Bahadure | G06F 3/0605 |
| | | | | 711/162 |
| 2013/0262387 | A1* | 10/2013 | Varadharajan | G06F 17/30581 |
| | | | | 707/639 |
| 2014/0149591 | A1 | 5/2014 | Bhattacharya et al. | |
| 2014/0149983 | A1 | 5/2014 | Bonilla et al. | |
| 2015/0006788 | A1 | 1/2015 | Liu et al. | |
| 2015/0205542 | A1* | 7/2015 | Antony | G06F 9/45558 |
| | | | | 711/162 |
| 2015/0254103 | A1* | 9/2015 | Chandrasekaran | G06F 9/4856 |
| | | | | 718/1 |
| 2015/0331757 | A1* | 11/2015 | Durge | G06F 11/1458 |
| | | | | 707/646 |
| 2015/0378624 | A1* | 12/2015 | Choudhary | G06F 3/0619 |
| | | | | 711/114 |
| 2015/0381723 | A1* | 12/2015 | Sancheti | G06F 3/065 |
| | | | | 709/217 |

\* cited by examiner

COPYING VIRTUAL MACHINE FLAT TIRES FROM A SOURCE TO TARGET COMPUTING DEVICE BASED ON MATCHING DISK LAYOUT

TECHNICAL FIELD

The present invention relates generally to the field of computer systems, and more particularly to improving a whole-instance import efficiency.

BACKGROUND

The use of virtualization is becoming widespread. Virtualization describes a software abstraction that separates a computer resource and its use from an underlying physical device. Generally, a virtual machine (VM) provides a software execution environment and may have a virtual processor, virtual system memory, virtual storage, and various virtual devices. Virtual machines have the ability to accomplish tasks independent of particular hardware implementations or configurations. System virtualization is implemented through some managing functionality, typically hypervisor technology. Hypervisors, also called virtual machine managers (VMMs), use a thin layer of code in software or firmware to achieve fine-grained, dynamic resource sharing. Because hypervisors provide the greatest level of flexibility in how virtual resources are defined and managed, they are generally the primary technology for system virtualization.

Virtual machines may be migrated between a source host computing platform ("the source host") and a destination host computing platform ("the destination host") connected over a network, which may be a local area network or a wide area network that may include the Internet. Migration can include a move from a source environment to a target environment where the source environment is separate and under different management and security control than the target environment. Whole-instance migration includes capturing an entire operating system (OS) with the software and data included in image form, transferring the system to a new environment and restarting the system. Whole-instance migration is often needed when a customer does not have sufficient documentation of its applications for easy re-install. In addition, whole-instance migration can capture changes made to the server after the initial server setup that were not properly documented.

SUMMARY

A first aspect of the present invention discloses a method including one or more computer processors mounting a computing device to a target instance, wherein the computing device stores one or more virtual disks of a source instance, and wherein the target instance includes one or more local disks. The one or more computer processors detect a disk layout of the source instance. The one or more computer processors match the disk layout of the source instance to a disk layout of the target instance. The one or more computer processors attach the one or more virtual disks of the source instance to the corresponding one or more local disks of the target instance, wherein the one or more virtual disks of the source instance are attached as one or more flat files. The one or more computer processors copy the one or more flat files to the corresponding one or more local disks of the target instance.

A second aspect of the present invention discloses a computer program product including one or more computer readable storage device and program instructions stored on the one or more computer readable storage device. The stored program instructions include program instructions to mount a computing device to a target instance, wherein the computing device stores one or more virtual disks of a source instance, and wherein the target instance includes one or more local disks. The stored program instructions include program instructions to detect a disk layout of the source instance. The stored program instructions include program instructions to match the disk layout of the source instance to a disk layout of the target instance. The stored program instructions include program instructions to attach the one or more virtual disks of the source instance to the corresponding one or more local disks of the target instance, wherein the one or more virtual disks of the source instance are attached as one or more flat files. The stored program instructions include program instructions to copy the one or more flat files to the corresponding one or more local disks of the target instance.

A third aspect of the present invention discloses a computer system including one or more computer processors and one or more computer readable storage device, wherein the program instructions are stored on the one or more computer readable storage device for execution by at least one of the one or more computer processors. The stored program instructions include program instructions to mount a computing device to a target instance, wherein the computing device stores one or more virtual disks of a source instance, and wherein the target instance includes one or more local disks. The stored program instructions include program instructions to detect a disk layout of the source instance. The stored program instructions include program instructions to match the disk layout of the source instance to a disk layout of the target instance. The stored program instructions include program instructions to attach the one or more virtual disks of the source instance to the corresponding one or more local disks of the target instance, wherein the one or more virtual disks of the source instance are attached as one or more flat files. The stored program instructions include program instructions to copy the one or more flat files to the corresponding one or more local disks of the target instance.

DETAILED DESCRIPTION

Virtual to virtual (V2V) server migrations and physical to virtual (P2V) server migrations are typically performed by tools that write from a customer zone onto a hypervisor in a cloud environment, such as an infrastructure-as-a-service (IaaS) virtual machine, where the customer zone is a secure network, protected by firewalls, and where both the customer and a cloud administrator have access. Often, such as in a cloud environment which typically servers multiple customers, the target hypervisor, a key component in securing separation between customers, is in a secured environment, such that data flow directly from the customer zone is not permitted. In order to address network security, migration may be performed across multiple intermediate zones, requiring multiple copy steps. Copy steps may include a conversion from a virtual disk format to a RAW format which can require additional time and storage. In addition, cross-zone traffic may have to pass through firewalls and may be restricted in bandwidth, while storage at intermediate steps may limit scalability. Embodiments of the present invention recognize efficiency may be gained by attaching a source instance disk to a target instance as a flat file representation and block copying the contents of the file to prevent additional time and storage needed for a file conversion process, while keeping data flows within the customer zone, therefore shortening the migration timeline. Embodiments of the present invention are independent of an operating system and do not require additional copying or transferring operations. Implementation of embodiments of the invention may take a variety of forms, and exemplary implementation details are discussed subsequently with reference to the Figures.

Figure 1:
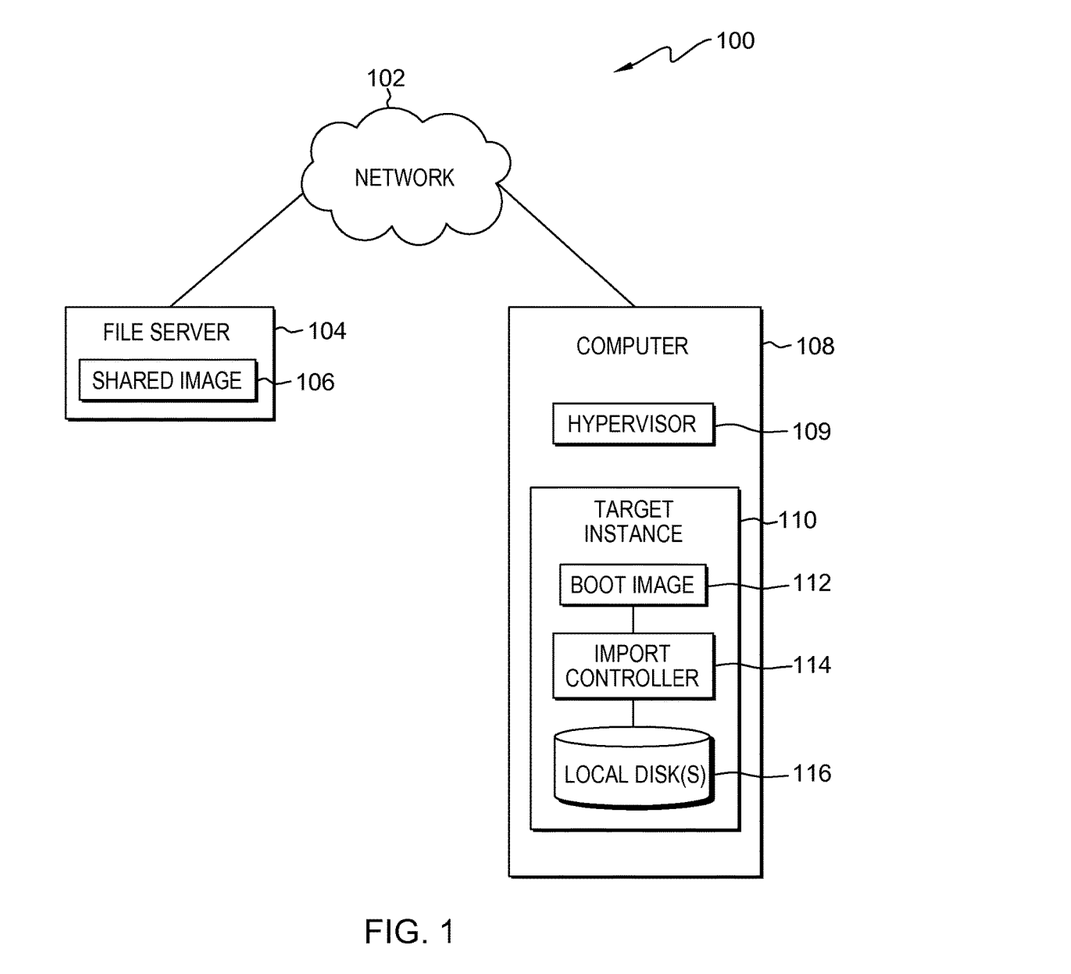
FIG. 1 is a functional block diagram illustrating a virtualized computing environment, in accordance with an embodiment of the present invention.

FIG. 1 is a functional block diagram illustrating a virtualized computing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Virtualized computing environment 100 includes file server 104 and computer 108, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between file server 104 and computer 108, and other computing devices (not shown) within virtualized computing environment 100.

File server 104 is a computing device connected to network 102 that has the primary purpose of providing a location for shared disk access, i.e., shared storage of computer files (such as documents, sound files, photographs, movies, images, databases, etc.) that can be accessed by other computing devices connected to network 102. File server 104 enables the storage and retrieval of data. File server 104 can represent one or more file servers. File server 104 is a staging destination for a copy of a source instance (not shown) to reside to enable copying to target instance 110 during a server migration process. In an embodiment where file server 104 represents multiple file servers, parallel migrations are enabled. File server 104 includes shared image 106.

Shared image 106 is a copy of a source instance (not shown) that exists as a compressed file. In one embodiment, shared image 106 is an open virtualization format (OVF) file containing metadata of a virtual machine and virtual disk files, e.g., VM templates and VM images, in virtual machine disk (VMDK) format. VMDK format is a file format describing containers for virtual hard disk drives to be used in virtual machines. In one embodiment, file server 104 resides in a customer zone that includes target instance 110, enabling target instance 110 to reach shared image 106 for copying during a migration process without concerns regarding network security.

Computer 108 can be a standalone computing device, a management server, a web server, a mobile computing device, or any other electronic device or computing system capable of receiving, sending, and processing data. In other embodiments, computer 108 can represent a server computing system utilizing multiple computers as a server system, such as in a cloud computing environment ("the cloud"). In another embodiment, computer 108 can be a laptop computer, a tablet computer, a netbook computer, a personal computer (PC), a desktop computer, a personal digital assistant (PDA), a smart phone, or any programmable electronic device capable of communicating with file server 104 and other computing devices (not shown) within virtualized computing environment 100 via network 102. In another embodiment, computer 108 represents a computing system utilizing clustered computers and components (e.g., database server computers, application server computers, etc.) that act as a single pool of seamless resources when accessed within virtualized computing environment 100. Computer 108 includes hypervisor 109 and target instance 110. In general, hypervisor 109 may manage the operating systems and execution of target instance 110. In some embodiments, hypervisor 109 can represent a plurality of hypervisors within virtualized computing environment 100.

In the depicted embodiment, target instance 110 represents one or more virtual machines partitioned from computer 108. Target instance 110 is a software implemented abstraction of hardware of computer 108. Target instance 110 can be utilized to emulate functions of a physical computer (e.g., execute programs). In one embodiment, resources of computer 108 (e.g., memory, central processing units (CPUs), storage devices, and I/O devices (not shown)) can be partitioned into one or more virtual machines in target instance 110. In another embodiment, target instance 110 may be a physical computing device. If target instance 110 is a physical computing device, then hypervisor 109 may not be present in virtualized computing environment 100. In the depicted embodiment, target instance 110 is created from a copy of shared image 106. Target instance 110 includes boot image 112, import controller 114, and local disk(s) 116.

In one embodiment, boot image 112 can be a file or a disk, physical or virtual, such as a virtual compact disk (CD). In another embodiment, boot image 112 may be written onto a disk included in target instance 110 during VM provisioning, and then may be unmounted after booting is complete. Boot image 112 may be in an ISO file format. In general, a boot image includes the operating system, utilities and diagnostics, as well as boot and data recovery information. Boot image 112 is independent of an operating system (OS) and is a static image that is read-only. Boot image 112 is part of an "in memory environment" such that use of boot image 112 allows target instance 110 to boot while neither the OS nor local disk(s) 116 are in a running state.

Import controller 114 manages a plurality of activities associated with importing a source instance to a target instance, such as target instance 110. In one embodiment, import controller 114 is temporarily attached to target instance 110 in an "in memory environment" for a server migration process. Import controller 114 includes logic and intelligence to discover, or detect, source disk layout and match the layout to the disk layout of target instance 110. Import controller 114 attaches VMDK files from shared image 106 to target instance 110 as a flat file representation. Import controller 114 copies the attached VMDK files to local disk(s) 116 of target instance 110. Import controller 114 is depicted and described in further detail with respect to FIG. 3.

Local disk(s) 116 can be implemented with any type of storage device capable of storing data and configuration files that can be accessed and utilized by target instance 110, such as a database server, a hard disk drive, or a flash memory. In other embodiments, local disk(s) 116 can represent multiple storage devices within target instance 110. Local disk(s) 116 store copies of one or more VMDK files from shared image 106, which import controller 114 uses in a server migration process.

Figure 2:
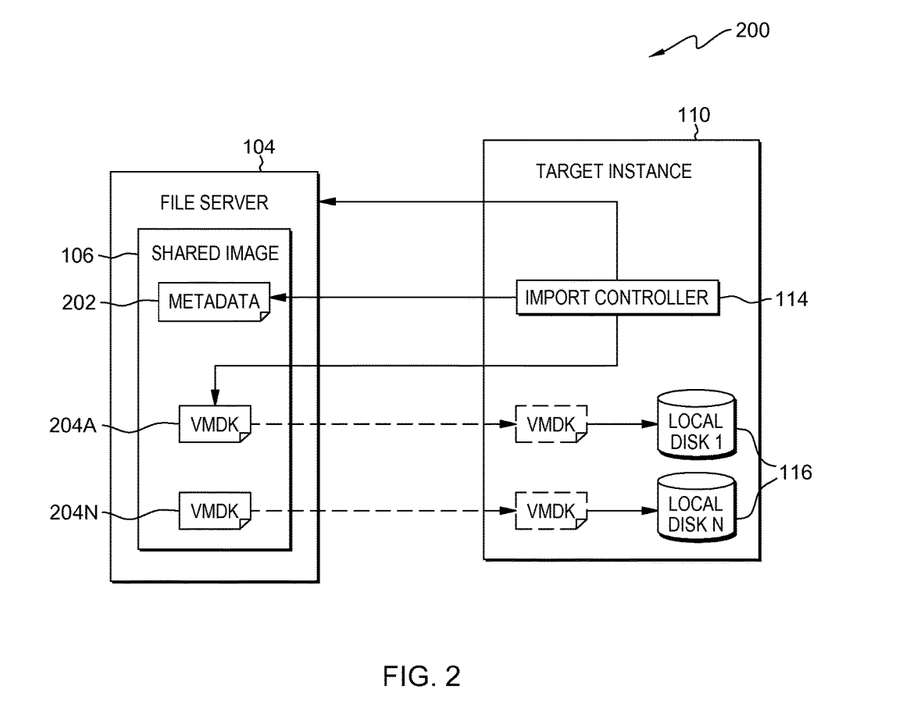
FIG. 2 is a flow diagram depicting an instance import process, within the virtualized computing environment of FIG. 1, in accordance with an embodiment of the present invention.

FIG. 2 is flow diagram 200 depicting an instance import process, within virtualized computing environment 100 of FIG. 1, in accordance with an embodiment of the present invention.

Flow diagram 200 indicates the flow of information during the instance import process between file server 104 and target instance 110. For example, import controller 114, as described with respect to FIG. 1, mounts file server 104 to target instance 110. Mounting file server 104 makes shared image 106 accessible to the OS on target instance 110. Metadata 202 and VMDK(s) 204 reside within shared image 106. VMDK 204A represents a first virtual disk and VMDK 204N, where the letter N represents a numeral greater than one, represents the total number of VMDKs included in shared image 106. In the same respect, local disk(s) 116 are represented by local disk 1 and local disk N, where the letter N represents a numeral greater than one which equals the number of VMDKs copied. Metadata 202 describes the attributes of the source instance disks, for example, disk layout and disk size. VMDK 204A and VMDK 204N represent a plurality of virtual disks copied from the source instance and stored within file server 104. In one embodiment, metadata 202, VMDK 204A, and VMDK 204N reside directly in shared image 106. In another embodiment, metadata 202, VMDK 204A, and VMDK 204N reside within an OVF file.

Import controller 114 detects the disk layout of VMDK(s) 204 via metadata 202 in order to be able to match the disk layout of local disk(s) 116 prior to copying. The dotted lines represent import controller 114 attaching VMDK(s) 204 as a flat file representation to target instance 110. Once attached, import controller 114 block copies the VMDK files onto local disk(s) 116.

Figure 3:
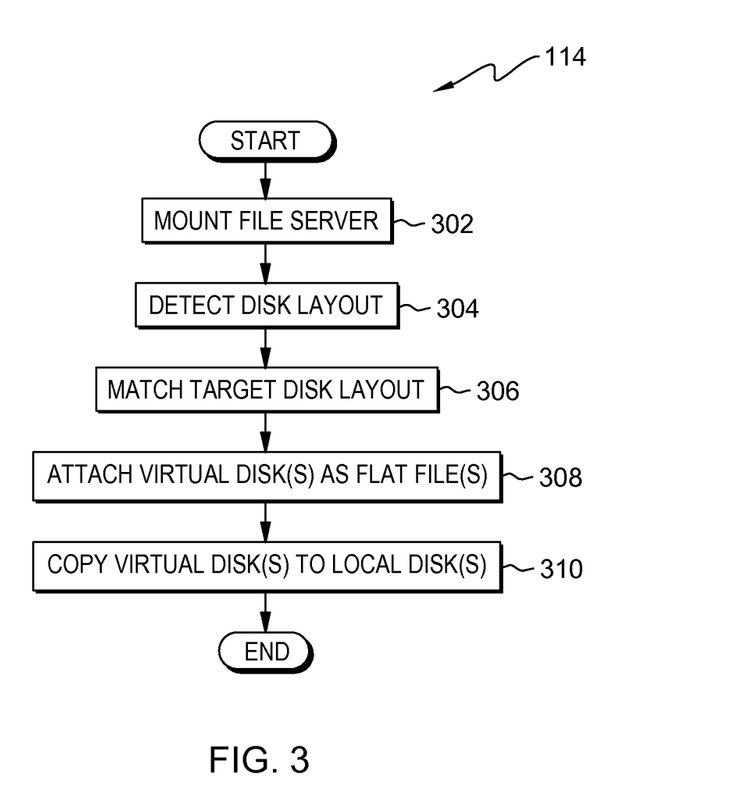
FIG. 3 is a flowchart depicting operational steps of an import controller, on a hypervisor computer within the virtualized computing environment of FIG. 1, for improving efficiency of importing an instance, in accordance with an embodiment of the present invention.

FIG. 3 is a flowchart depicting operational steps of import controller 114, on computer 108 within virtualized computing environment 100 of FIG. 1, for improving efficiency of importing an instance, in accordance with an embodiment of the present invention.

Import controller 114 mounts a file server (step 302). Import controller 114 mounts file server 104 to target instance 110, i.e., makes shared image 106 accessible to the OS on target instance 110 by giving file server 104 a mount point or reference address. In an embodiment, import controller 114 mounts a file share from within file server 104 that hosts an image of the source instance. A file share is a shared folder from another system on a network, such as network 102.

Import controller 114 detects the disk layout (step 304). Import controller 114 processes metadata included in shared image 106, such as metadata 202, as discussed with respect to FIG. 2, to identify the disk layout of the source instance from which shared image 106 was created. For example, in an embodiment where shared image 106 is an OVF file, import controller 114 may determine the number of virtual disks within the OVF file and the size of each of the virtual disks. Import controller 114 may also determine which of the disks is the primary disk.

Import controller 114 matches the target disk layout (step 306). Import controller 114 detects the layout of local disk(s) 116 on target instance 110, compares the layout to the detected disk layout of shared image 106, and identifies peers between the disks of shared image 106 and local disk(s) 116. In one embodiment, import controller 114 looks for a matching parameter, such as disk ordering. For example, import controller 114 may match logical ordering on a small computer system interface (SCSI) bus by the SCSI ID of each disk. In another example, import controller 114 determines which of local disk(s) 116 is the primary disk of target instance 110 and matches that disk to the primary disk of shared image 106.

Import controller 114 attaches virtual disk(s) as flat files (step 308). In one embodiment, import controller 114 utilizes administrative data interface tools, as known in the art of computing virtualization, to attach the virtual disks, e.g., VMDK files, of shared image 106 to target instance 110 in a flat file representation. VMDK files can act as a virtual disk that includes the content of a source instance. By attaching the VMDKs as a flat file, no network flow or administrative access to a hypervisor or other shared infrastructure building blocks is required for the import. In addition, no file conversions, e.g., conversion to RAW format, between different disk formats is required, which may save time and file space, because a VMDK file is compressed.

Import controller 114 copies virtual disk(s) to local disk(s) (step 310). In one embodiment, import controller 114 uses a block copy technique to transfer the content from the attached virtual disk flat file to local disk(s) 116. A block is a unit measuring a number of bytes read, written, or converted at one time. For example, import controller 114 may use a "DD" copy command, as is known to those of ordinary skill in the art, to copy blocks from attached VMDK flat files to local disk(s) 116. A DD command, whose primary purpose is to convert and copy files, can duplicate data across files, devices, partitions, and volumes. A DD command operates below the file system and the OS, and therefore is independent of the complexity of a file system, an OS, a hypervisor, and a platform. In this way, import controller 114 can copy block by block onto local disk(s) 116 to create a replica of the source image.

Figure 4:
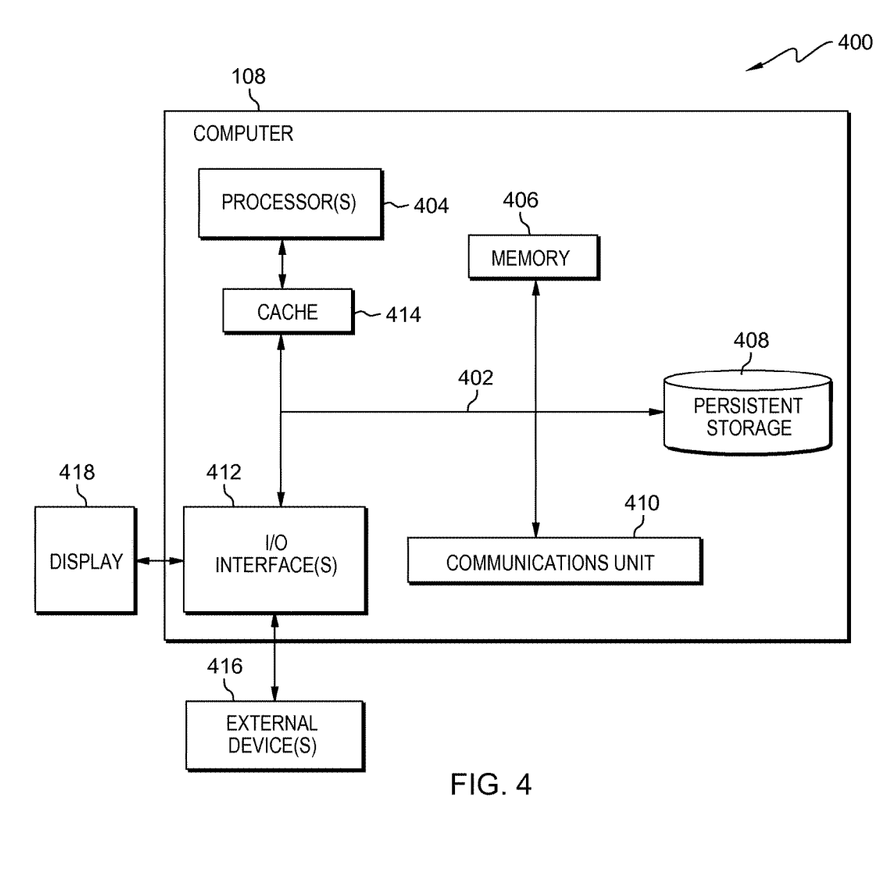
FIG. 4 depicts a cloud computing node, in accordance with an embodiment of the present invention.

Referring now to FIG. 4, a schematic of an example of a cloud computing node is shown. Cloud computing node 400 is only one example of a suitable cloud computing node and is not intended to suggest any limitation as to the scope of use or functionality of embodiments of the invention described herein. Regardless, cloud computing node 400 is capable of being implemented and/or performing any of the functionality set forth hereinabove.

In cloud computing node 400 there is a computer 108, which is operational with numerous other general purpose or special purpose computing system environments or configurations. Examples of well-known computing systems, environments, and/or configurations that may be suitable for use with computer 108 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer 108 may be described in the general context of computer system-executable instructions, such as program modules, being executed by a computer system. Generally, program modules may include routines, programs, objects, components, logic, data structures, and so on that perform particular tasks or implement particular abstract data types. Computer 108 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer 108 in cloud computing node 400 is shown in the form of a general-purpose computing device. Computer 108 includes processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses. In an embodiment, communications fabric 402 represents one or more of any of several types of bus structures, including a memory bus or a memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention are stored in persistent storage 408 for execution and/or access by one or more of the respective processor(s) 404 via memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of file server 104. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to cloud computing node 400. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media, for example, devices such as thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touchscreen, such as a display of a tablet computer.

It should be understood that although not shown, other hardware and/or software components could be used in conjunction with server computer 118. Examples include, but are not limited to: microcode, device drivers, redundant processing units, external disk drive arrays, RAID systems, tape drives, and data archival storage systems, etc.

Figure 5:
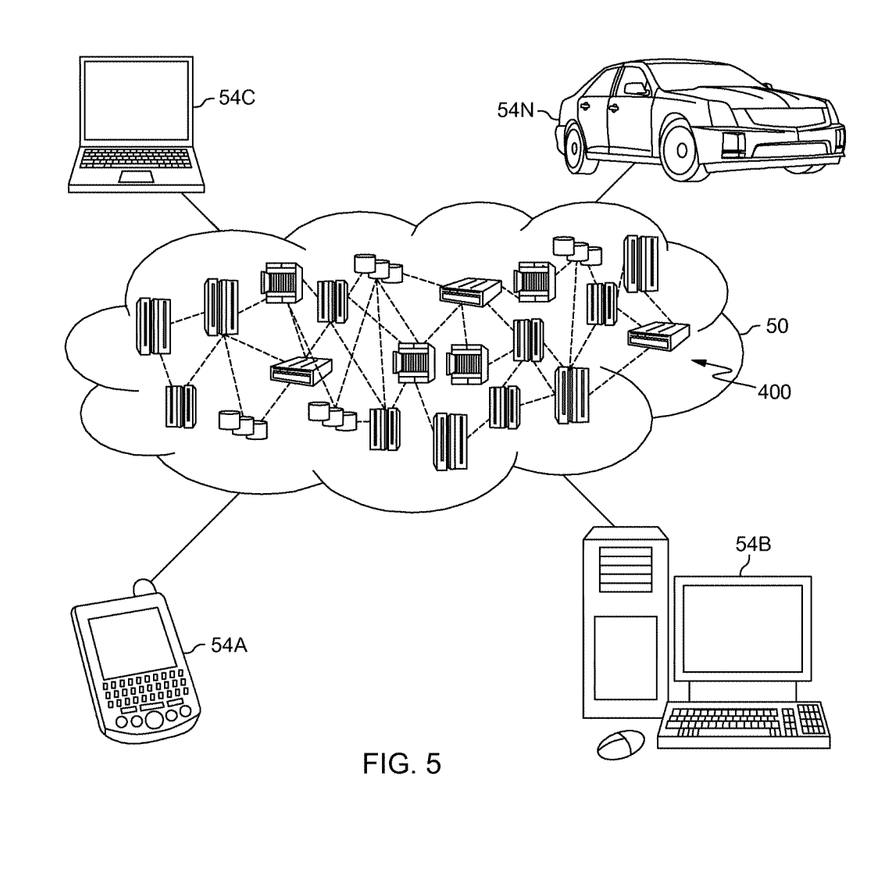
FIG. 5 depicts a cloud computing environment, in accordance with an embodiment of the present invention.

Referring now to FIG. 5, illustrative cloud computing environment 50 is depicted. As shown, cloud computing environment 50 comprises one or more cloud computing nodes 400 with which local computing devices used by cloud consumers, such as, for example, personal digital assistant (PDA) or cellular telephone 54A, desktop computer 54B, laptop computer 54C, and/or automobile computer system 54N may communicate. Nodes 400 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 400 and cloud computing environment 50 can communicate with any type of computerized device over any type of network and/or network addressable connection (e.g., using a web browser).

Figure 6:
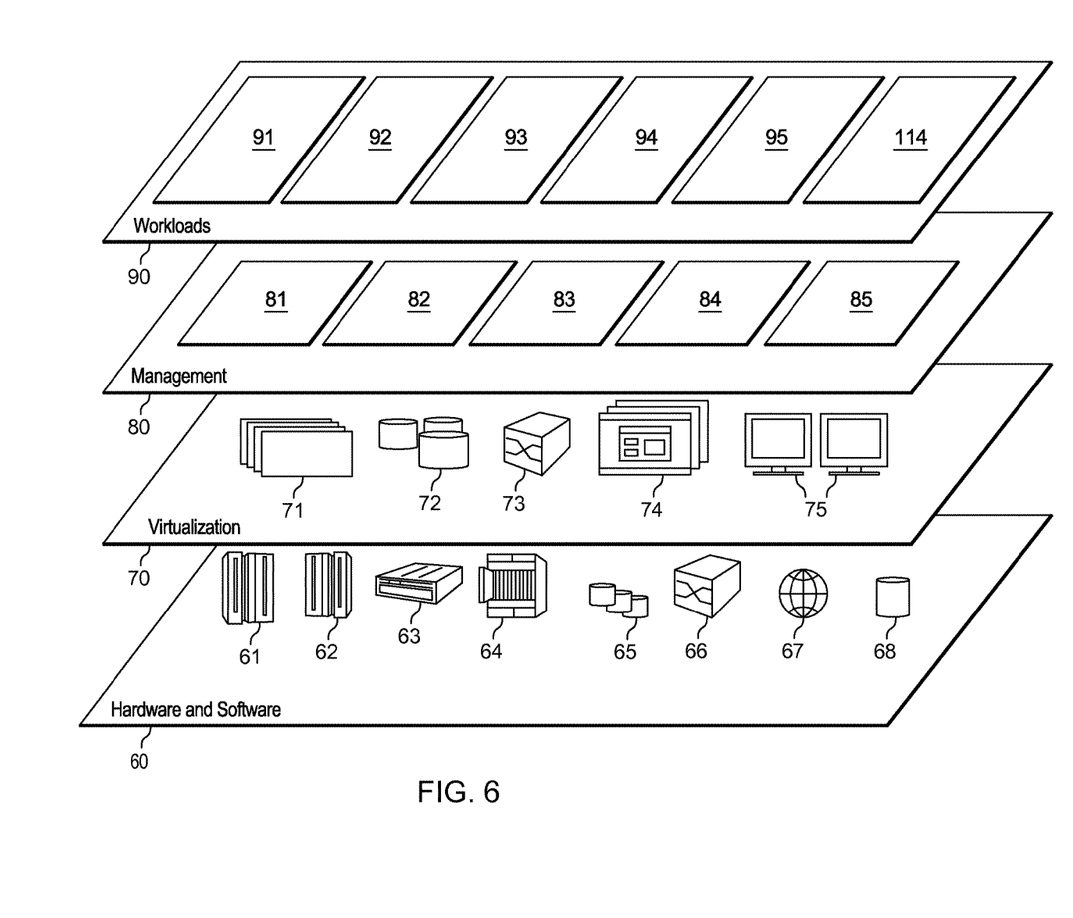
FIG. 6 depicts abstraction model layers, in accordance with an embodiment of the present invention.

Referring now to FIG. 6, a set of functional abstraction layers provided by cloud computing environment 50 (FIG.

5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and import controller 114.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    mounting, by one or more computer processors, a computing device to a target instance, wherein the computing device stores one or more virtual disks of a source instance, and wherein the target instance includes one or more local disks;
    detecting, by the one or more computer processors, one or more parameters of a disk layout of the source instance, wherein the one or more parameters of the disk layout include at least a disk ordering and a primary disk;
    matching, by the one or more computer processors, the one or more parameters of the disk layout of the source instance to one or more parameters of a disk layout of the target instance;
    based, at least in part, on the matching of the one or more parameters of the disk layout, attaching, by the one or more computer processors, the one or more virtual disks of the source instance to a corresponding one or more local disks of the target instance, wherein the one or more virtual disks of the source instance are attached as one or more flat files; and
    copying, by the one or more computer processors, the one or more flat files to the corresponding one or more local disks of the target instance.

2. The method of claim 1, wherein said detecting one or more parameters of the disk layout of the source instance comprises processing, by the one or more computer processors, metadata associated with the one or more virtual disks.

3. The method of claim 1, wherein said matching the one or more parameters of the disk layout of the source instance to the one or more parameters of the disk layout of the target instance comprises:
    determining, by the one or more computer processors, one or more matching parameters of the source instance;
    comparing, by the one or more computer processors, the one or more matching parameters of the source instance to one or more corresponding parameters of the target instance; and
    based, at least in part, on the comparison, identifying, by the one or more computer processors, one or more peers between one or more disks of the source instance and one or more disks of the target instance.

4. The method of claim 1, wherein the one or more virtual disks of the source instance are in virtual machine disk (VMDK) format.

5. The method of claim 1, wherein the one or more virtual disks of the source instance are included in an open virtualization format (OVF) file.

6. The method of claim 1, wherein said copying the one or more flat files to the corresponding one or more local disks of the target instance comprises utilizing, by the one or more computer processors, a block copy technique.

7. The method of claim 1, wherein said copying the one or more flat files to the corresponding one or more local disks of the target instance comprises utilizing, by the one or more computer processors, a DD command.

8. A computer program product comprising:
    one or more computer readable storage medium and program instructions stored on the one or more computer readable storage medium, the stored program instructions comprising:
    program instructions to mount a computing device to a target instance, wherein the computing device stores one or more virtual disks of a source instance, and wherein the target instance includes one or more local disks;
    program instructions to detect one or more parameters of a disk layout of the source instance, wherein the one or more parameters of the disk layout include at least a disk ordering and a primary disk;
    program instructions to match the one or more parameters of the disk layout of the source instance to one or more parameters of a disk layout of the target instance;
    program instructions to, based, at least in part, on the matching of the one or more parameters of the disk layout, attach the one or more virtual disks of the source instance to a corresponding one or more local disks of the target instance, wherein the one or more virtual disks of the source instance are attached as one or more flat files; and
    program instructions to copy the one or more flat files to the corresponding one or more local disks of the target instance.

9. The computer program product of claim 8, wherein the stored program instructions to detect one or more parameters of the disk layout of the source instance further comprise program instructions to process metadata associated with the one or more virtual disks.

10. The computer program product of claim 8, wherein the stored program instructions to match the one or more parameters of the disk layout of the source instance to the one or more parameters of the disk layout of the target instance further comprise:
    program instructions to determine one or more matching parameters of the source instance;
    program instructions to compare the one or more matching parameters of the source instance to one or more corresponding parameters of the target instance; and
    program instructions to, based, at least in part, on the comparison, identify one or more peers between one or more disks of the source instance and one or more disks of the target instance.

11. The computer program product of claim 8, wherein the one or more virtual disks of the source instance are in virtual machine disk (VMDK) format.

12. The computer program product of claim 8, wherein the one or more virtual disks of the source instance are included in an open virtualization format (OVF) file.

13. The computer program product of claim 8, wherein the stored program instructions to copy the one or more flat files to the corresponding one or more local disks of the target instance further comprise program instructions to utilize a block copy technique.

14. The computer program product of claim 8, wherein the stored program instructions to copy the one or more flat files to the corresponding one or more local disks of the target instance further comprise program instructions to utilize a DD command.

15. A computer system comprising:
one or more computer processors;
one or more computer readable storage device;
program instructions stored on the one or more computer readable storage device for execution by at least one of the one or more computer processors, the stored program instructions comprising:
program instructions to mount a computing device to a target instance, wherein the computing device stores one or more virtual disks of a source instance, and wherein the target instance includes one or more local disks;
program instructions to detect one or more parameters of a disk layout of the source instance, wherein the one or more parameters of the disk layout include at least a disk ordering and a primary disk;
program instructions to match the one or more parameters of the disk layout of the source instance to one or more parameters of a disk layout of the target instance;
program instructions to, based, at least in part, on the matching of the one or more parameters of the disk layout, attach the one or more virtual disks of the source instance to a corresponding one or more local disks of the target instance, wherein the one or more virtual disks of the source instance are attached as one or more flat files; and
program instructions to copy the one or more flat files to the corresponding one or more local disks of the target instance.

16. The computer system of claim 15, wherein the stored program instructions to detect one or more parameters of the disk layout of the source instance further comprise program instructions to process metadata associated with the one or more virtual disks.

17. The computer system of claim 15, wherein the stored program instructions to match the one or more parameters of the disk layout of the source instance to the one or more parameters of the disk layout of the target instance further comprise:
program instructions to determine one or more matching parameters of the source instance;
program instructions to compare the one or more matching parameters of the source instance to one or more corresponding parameters of the target instance; and
program instructions to, based, at least in part, on the comparison, identify one or more peers between one or more disks of the source instance and one or more disks of the target instance.

18. The computer system of claim 15, wherein the one or more virtual disks of the source instance are in virtual machine disk (VMDK) format.

19. The computer system of claim 15, wherein the one or more virtual disks of the source instance are included in an open virtualization format (OVF) file.

20. The computer system of claim 15, wherein the stored program instructions to copy the one or more flat files to the corresponding one or more local disks of the target instance further comprise program instructions to utilize a block copy technique.

* * * * *

UNITED STATES PATENT AND TRADEMARK OFFICE
CERTIFICATE OF CORRECTION

| | | |
|---|---|---|
| PATENT NO. | : 9,569,138 B2 | Page 1 of 1 |
| APPLICATION NO. | : 14/739145 | |
| DATED | : February 14, 2017 | |
| INVENTOR(S) | : Florian D. Graf et al. | |

It is certified that error appears in the above-identified patent and that said Letters Patent is hereby corrected as shown below:

On the Title Page

Item (54) and in the Specification, Column 1, Lines 1-4:
Title should read: "COPYING VIRTUAL MACHINE FLAT FILES FROM A SOURCE TO TARGET COMPUTING DEVICE BASED ON MATCHING DISK LAYOUT".

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*